United States Patent Office 3,209,533
Patented Oct. 5, 1965

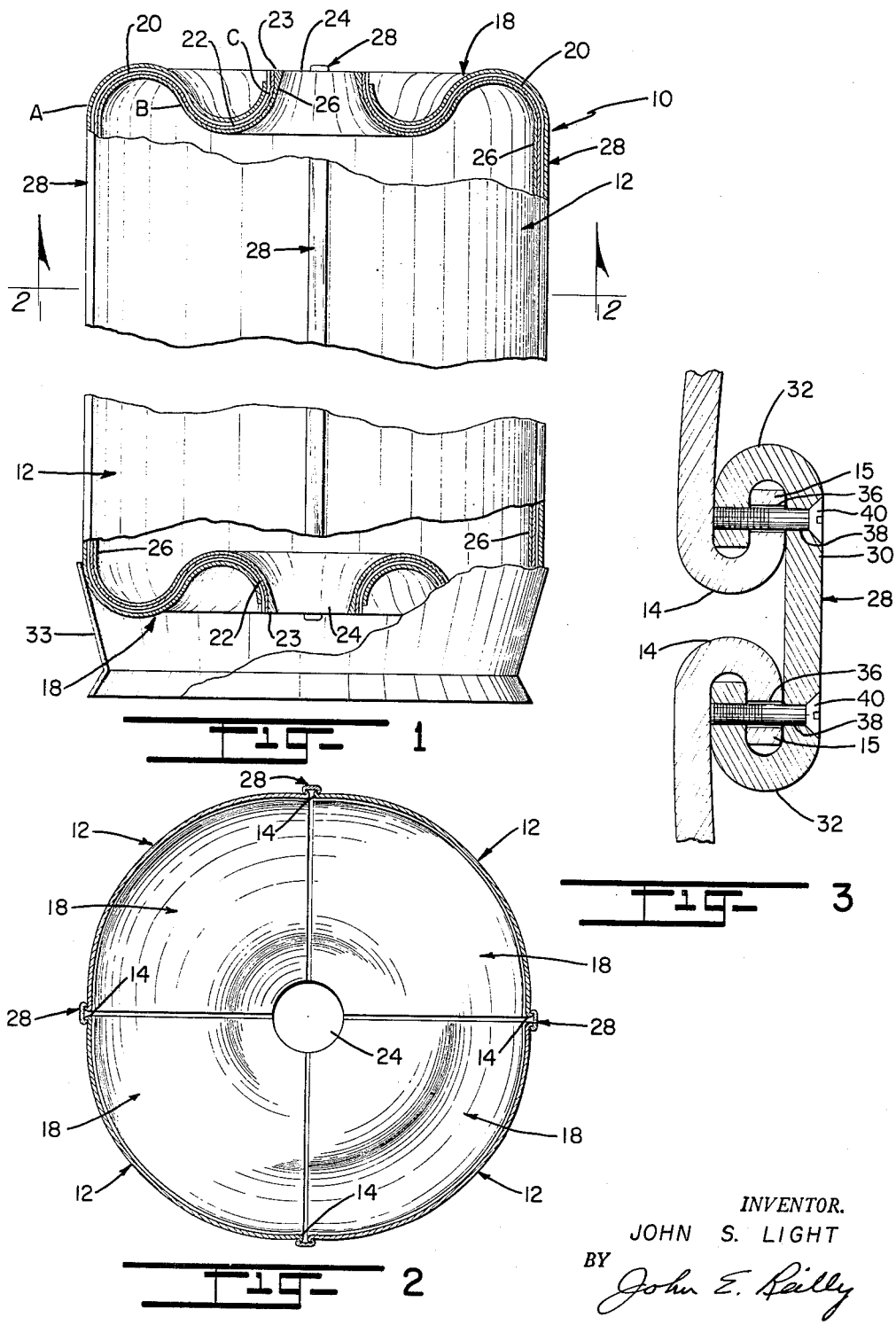

3,209,533
ROCKET SHELL CONSTRUCTION
John S. Light, 9905 W. 21st Ave., Lakewood, Colo.
Filed Apr. 21, 1961, Ser. No. 104,652
6 Claims. (Cl. 60—35.6)

This invention relates to a rocket shell construction and to a method of fabricating and assembling same; and, more particularly, relates to the design and construction of a thin-shell casing for a solid-propellant space rocket or missile.

The primary objective and purpose of this invention is to provide a missile or rocket shell construction affording ease and efficiency in construction, requiring a minimum number of steps in its formation, and specifically enabling its formation in sections for shipment to, and assembly at, the desired site of firing. Moreover, the resultant construction provides for optimum stress distribution in use and is exceedingly lightweight for its high strength and yield, is easy to fabricate and assemble and is conformable for use in various firing stages.

It is another object to make provision for a thin-shell casing which avoids the utilization and time-consuming fabrication of highly expensive, extremely long tubular shell members, and furthermore enables greatly improved interconnection between the elements comprising the rocket throughout its length and at the end portions thereof to provide for a unitary high strength casing.

It is a further object to provide for a new and improved end construction for a rocket shell which enables considerable reduction in length of the entire rocket relative to the useful space while at the same time enabling ease of attachment for extraneous hardware and accessories, and which end construction further substantially increases the over-all strength of the rocket and provides for more even distribution of stress, particularly at the point of transition from the outer circumference into the end portions.

It is a still further object of the present invention to make provision for a method of prefabricating and assembling a shell structure for a rocket and the like which is rapid, requires a minimum number of parts and steps in its fabrication, can be selectively heat-treated at the most critical areas and rapidly assembled and disassembled for subsequent shipment in disassembled, compact form to the intended point of use.

It is an additional object of the present invention to provide for a unique means of formation and connection of panels to comprise a thin-shell rocket construction and the like which enables rapid and effective assembly and loading in the field at the site of firing.

Broadly, in accordance with the present invention, a completely unique approach is taken in the prefabrication and construction of a thin-shell casing for rockets wherein essentially the shell is made up of a series of longitudinal panel sections interconnected along longitudinal edges in self-locking relation, thus avoiding conventional means such as threading and shear rings at the connecting portions and in this way to provide, for all intents and purposes, a unitary shell construction. In cooperation therewith, the end closure or wall portions for the shell represent a completely new approach in design and construction, and enable considerable increase in strength of the entire rocket while reducing its length in relation to the useful space contained in the rocket. More specifically, the end closures are made comparatively flat to allow for loading essentially to the end of the shell to increase loading density and also to do away with turbulent gas flow characteristics of present methods while retaining necessary ballistic characteristics for high-speed flight. From a geometrical standpoint the end closures, although relatively flat, are formed on a curvature, according to the dimensions of the rocket, which will provide maximum strength at the ends, will permit easy attachment of accessories or hardware through the ends of the shell and will further provide for optimum stress distribution throughout the end from the point of convergence from the circumference of the shell into the throat area. Essentially, the end closures are of toroidal configuration based on a spherical radius which is initiated in a positive direction from the outer circumference, then reversed to form a negative curved surface of generation into the throat area and where the radii of curvature selected throughout are dictated in accordance with stress consideration at the ends.

The above objects, advantages and features will become more readily understood from the following detailed description taken together with the accompanying drawings, in which:

FIGURE 1 is a fragmentary elevational view, partially in section, of a rocket shell construction in accordance with the preferred form of invention;

FIGURE 2 is an end sectional view taken on lines 2—2 of FIGURE 1; and

FIGURE 3 is a detailed cross-sectional view of the means of connection employed in the formation of the rocket.

To best exemplify the present invention, it will be described with reference to construction of a solid propellant type rocket which, for purposes of illustration and not limitation, may be on the order of 80 feet in length, 15 feet in diameter and with a casing 0.30 inch thick. Essentially, the rocket 10 as illustrated is formed from a number of longitudinal panel sections 12, four being the preferred number, and where each panel is formed by passing a metal sheet of the required width and length through a series of large rolling towers to gradually increase its curvature into that of a quadrant of a circle possessing the arc of a circumference corresponding to the 15-foot diameter of the rocket. Preferably, this is a cold-roller process and the longitudinal edges 14 of the panels are curved outwardly and back upon themselves to form offset, return lips or flanges 15 for a purpose to be described. Preferably, the return flanges are generally U-shaped in cross-section to form a shallow channel running the length of each panel.

Next, from the rolling towers, each curved panel section is preferably fed horizontally, in a continuous manner, through a controlled atmosphere furnace, or commercial strip-furnace, in order to carburize the outer surface of the panel until it attains the desired hardness. Usually and with reference to the particular dimensions of the rocket described, the carburization may be ½₂" deep at a Rockwell C58 and the inside core ¼" at Rockwell C44. This will, of course, vary primarily according to the thickness of the shell.

Each panel is also formed with excess material at its ends for the purpose of forming partially closed end portions 18, in the basic form of a double reverse torus configuration. The ends are shaped preferably in a continuous procedure, such as by means of a hydraulic press. In a well-known manner, the press is utilized to apply the necessary bending moments to the end portions to shape them into an outer positively curved annular surface 20, semi-circular in cross-section, as from point $a$ to $b$, continuing into an inner, negatively curved annular surface 22, also semi-circular in cross-section, as from points $b$ to $c$, and terminating in an outwardly directed circular rim 23 defining the throat area 24 at each end of the rocket.

Following formation of the end sections, the excess material is trimmed off or removed and subsequently the ends if desired may be lined with suitable caramic or metal insulation 26, such as sprayed-on alumina or molybdenum.

Connector strips 28 are formed for interconnection of adjacent longitudinal edges of the panels, and each connector strip is fabricated to be of generally C-shaped cross-section having an intermediate flat portion 30 and generally U-shaped free ends 32 forming channel portions for reception of the flanges 15 extending along each longitudinal edge, as best seen from FIGURE 3. Fabrication is accomplished again by feeding the long narrow strips through a succession of curved rolling towers to progressively form the C section; then the C sections are similarly fed through a strip furnace and at this stage the sections are preferably heat-treated to a higher yield point and greater hardness than the panel sections. In addition, the ends of the strips are formed to correspond with the double reverse, semi-toroidal configuration of the panel sections.

The relative width of each of the strips in relation to the width of the return lips is such that the clearance between the inner free ends of the C is just greater than the lateral distance of each return flange plus the thickness of the casing, but is less than the combined lateral distance of the two flanges together. In this way, each return flange may be inserted within a channel individually and held loosely in place against accidental removal, and the free ends 32 are each similarly inserted in the channel of each flange to establish mating complementary engagement between the connector strip and each pair of longitudinal edges.

The particular form of toroidal end section deserves special consideration and is a principal feature of this invention, since it eliminates waste space as well as formation of more complicated cross-sectional formations, such as those of elliptical configuration, and enables formation from a circular cross-section so as to facilitate attachment of various accessories, such as, a skirt 33. In addition, the toroidal ends provide a somewhat stiffer construction in order to support the entire rocket and eliminate stress concentration at critical areas, particularly at the point of convergence from the outer shell toward the center opening of the rocket shell. This may be referred to as an optimum non-discontinuity stress factor because it enables convergence from one plane of stress to another in an elemental radial direction. The precise curvature of the double reverse semi-torus generally will be dictated by the pressure acting against the ends at the various points and for examples the following stresses are to be taken into consideration: hoop stress (chamber pressure multiplied by the shell radius); normal end pressure stress (chamber pressure multiplied by the area of the outer annular torus from a to b); and throat entrance pressure stress (chamber pressure multiplied by the area throughout the inner annulus surrounding the throat entrance). Broadly, it can be predicted that the radius will gradually progressively decrease from the outer shell circumference toward the end and will of course change from positive to negative as the direction of curvature reverses itself at the transition point b. In any event, it will be seen that the reverse curvature provides desirable advantages in greatly stiffening the end construction and also by substantially decreasing unnecessary space at the ends. For example, for a rocket construction 80 feet long, the length of the toroidal end sections beyond the outer shell would be on the order of two feet while effectively distributing the stress level evenly throughout the end portion and in fact, alleviating it at the transition point from the outer shell circumference. Similar considerations are involved in the construction of the connector strips so that the strips will be formed to match the end configuration of the shell. Of particular advantage here is that the reverse contour of the end panels will, in connected relation with the strips, result in snug fitting self-locking joints at the connection lines, particularly when expanded to full size as will be described.

Once the connector strips are formed and loosely connected to hold adjacent longitudinal edges of the panel sections in place, the interconnection of four panel sections will result in an elongated cylindrical shell. At this stage, an inflatable pressure bag is inserted through one end inside the loosely assembled panels and inflated to force the flange portions of the panels into tight outwardly disposed relation with the connector strips, so that the entire assembly will have a cross section must nearly approaching a perfect circle. Following this, and in order to prepare the rocket for subsequent assembly in the field, the side panel lips are bored at spaced intervals as at 36 to match bores 38 previously drilled in the strips and whereby the bores 38 may actually serve as a guide for the openings formed in the flanges. Once the holes are drilled, the bag may be collapsed and the entire assembly taken apart for shipment in separate sections to the site of use.

At the site, the panel sections are then reassembled in the same manner and socket head screws 40 may be employed to interconnect the strips and flanges to arrive at the final shell assembly. As a result, the interconnection of the panels by means of the connector strips establishes self-locking continuous joints enabling a practical and efficient way of rapidly and easily fabricating and assembling the shell from longitudinal panel sections.

Prior to loading the rocket with the solid propellant, an insulating, or bonding, agent is preferably used as a coating throughout the inner surface of the casing which coating covers the joints as well and acts to bond the propellant to the inner surface of the casing once cured, in accordance with known practice. Before loading the propellant, an inflatable core is inserted in the casing, the propellant is poured around the core, followed by inflation of the core to cause the propellant, which is normally of the consistency of uncured rubber, to compact and completely fill the rocket. The propellant is then cured using heater blankets, for example, and the core removed following the cure. The necessary accessories may then be secured to the rocket ends, such as, the skirt 33 and igniter at one end and a nozzle (not shown) secured to the central opening or throat at the opposite end.

The over-all advantages of this construction are that first, it is formed of longitudinal arcuate segments as opposed to full circumferential sections of a circle and eliminates the necessity of rolling sheets and welding together longitudinally or peripherally. Secondly, the sheet sections are formed of a higher yield point at the critical connecting points so that the small, very hard longitudinal connecting sectors have a high yield factor compared to tensile strength, and thus offer little or no bending and provide effectively a unitary construction with uniform stress distribution. Furthermore, the construction may be used at any stage of the firing including the booster stage. Next, the ability to transport the rocket in sections to the site of use eliminates one big objection to present types of rocket construction and needless to say, greatly decreases cost and space in shipping, since the panel sections can be easily stacked together along with the connecting strips.

It is therefore to be understood from the foregoing that various modifications and changes may be made in the method and structure of the present invention without departing from the scope thereof, as defined by the appended claims.

What is claimed is:

1. In a rocket, a casing having at least one end wall portion terminating in a central throat area, said end wall having a convex annular surface portion converging inwardly in a substantially radial direction from the peripheral end of said casing, said annular surface portion undergoing a gradual reversal in curvature in an inward axial direction between the periphery of said casing and the central throat area.

2. In a rocket, a casing including at least one relatively flat end wall portion converging inwardly in a radial direction and terminating in a central throat area, said end wall undergoing a gradual reversal in curvature, first positively then negatively, in opposite axial directions between the peripheral end of said casing and the central throat area.

3. In a rocket according to claim 2, said end wall being further characterized by defining outer convex and inner concave surface portions of semi-toroidal configuration.

4. A rocket shell structure having a casing defined by interconnected longitudinal panel sections, said panel sections terminating at opposite ends in relatively flat, radially extending annular wall portions, each end wall approximating in cross section a sinusoidal surface of generation curving inwardly in a generally radial direction first positively then negatively from the peripheral end of said casing.

5. In a rocket, a casing structure defined by a series of longitudinal arcuate panel sections having reverse-curved free longitudinal edges in spaced but adjacent relation, longitudinal connector strips interconnecting adjacent pairs of longitudinal edges in self-locking relation so as to constitute an outer shell of elongated cylindrical configuration, said shell including end wall portions forming inwardly directed continuations of the outer periphery of said casing each including an outer, convex annular surface of semi-toroidal configuration and an inner, concave annular surface of semi-toroidal configuration defining a radial and inward continuation of said convex surface, said concave surface terminating in a circular rim and forming a central throat area at each end of said casing.

6. A solid propellant rocket comprising a cylindrical shell defined by a series of longitudinal, complementary panels, each panel conforming in cross section with the arc of the circumference of said shell, return flanges having reverse-curved outer free ends extending radially and outwardly from the longitudinal edges of each panel, generally C-shaped longitudinal connector strips for interconnecting the longitudinal edges of said panels, said strips corresponding in length with the longitudinal edges and each strip including lateral ends overlapping the outer free ends of said flanges to provide for insertion and connection of said outer free ends within the lateral ends of said connector, and the terminal ends of said panels and connector strips, in connected relation, being of a semi-toroidal, double reverse configuration, each terminal end curving positively then negatively on a progressively decreasing radius from the outer circumference of said shell toward the center and with each terminating in a circular rim symmetrically disposed about the longitudinal axis of said shell.

References Cited by the Examiner

UNITED STATES PATENTS

| | | | |
|---|---|---|---|
| 967,629 | 8/10 | George | 220—80 |
| 2,497,888 | 2/50 | Hirschfelder | 60—35.6 |
| 2,503,191 | 4/50 | Branson | 29—421 |
| 2,544,538 | 3/51 | Mahnken | 60—39.69 |
| 2,762,193 | 9/56 | Johnson | 60—35.6 |
| 2,968,918 | 1/61 | Denison | 60—35.6 |
| 2,974,078 | 3/61 | Petritz et al. | 220—80 |
| 3,044,256 | 7/62 | Bayly et al. | 60—35.6 |
| 3,046,647 | 7/62 | Carstens | 29—421 |
| 3,069,847 | 12/62 | Vest | 60—35.6 |
| 3,074,585 | 1/63 | Koontz | 60—35.6 |

FOREIGN PATENTS

| | | |
|---|---|---|
| 1,112,030 | 11/55 | France. |
| 1,112,699 | 11/55 | France. |

MARK NEWMAN, *Primary Examiner.*

SAMUEL LEVINE, *Examiner.*